April 8, 1947.　　　　C. RIZZUTO　　　2,418,665
BABY CARRIAGE

Filed Nov. 5, 1945

INVENTOR.
CHARLES RIZZUTO
BY
Ross J. Woodward
ATTORNEY

Patented Apr. 8, 1947

2,418,665

UNITED STATES PATENT OFFICE 2,418,665

BABY CARRIAGE

Charles Rizzuto, Brooklyn, N. Y.

Application November 5, 1945, Serial No. 626,670

2 Claims. (Cl. 280—29)

This invention relates to an improved baby carriage and it is one object of the invention to provide a carriage having front wheels so mounted that when a street crossing is reached the front wheels may be lowered and the carriage very easily moved from a sidewalk onto a street without tilting the carriage. It will thus be seen that the carriage may be kept level and there will be no danger of a baby falling from the carriage as the carriage is moved from the sidewalk onto a street.

Another object of the invention is to provide a carriage with a front axle so mounted that it may be normally held in a position maintaining the front wheels level with the rear wheels by a latch which is moved to a releasing position by pressure of a hand operated lever carried by the handle at the rear end of the carriage. It will thus be seen that the front axle may be released by the thumb or heel of a hand grasping the handle and it will not be necessary for a person to release the handle of the carriage while operating the latch releasing mechanism and there will be no danger of a baby being injured by the carriage accidentally rolling onto a street.

Another object of the invention is to provide means for yieldably resisting return of the front axle to its normal position and thus allow ample time for the rear wheels to move off of a curb and onto a street before the front wheels return to their normal position and the front axle is again engaged and secured by the latch.

The invention is illustrated in the accompanying drawings wherein.

Figure 1:
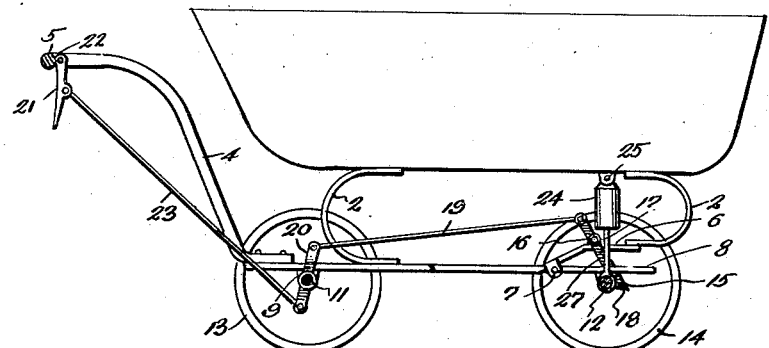
Fig. 1 is a side view of the carriage showing the front wheels in their normal position and the runners in their raised or inoperative position.
Figure 2:
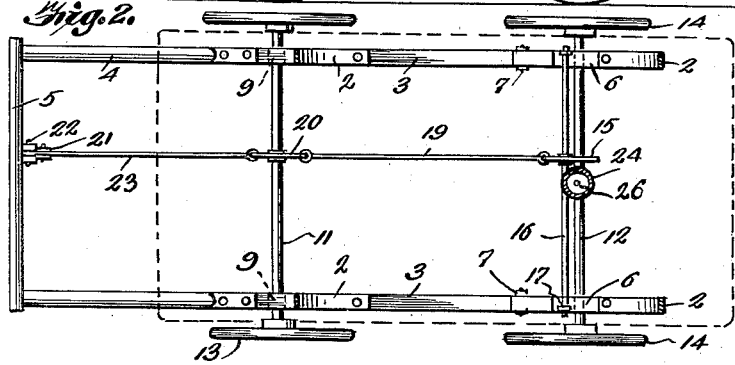
Fig. 2 is a top plan view of the baby carriage, the body being removed and indicated by dotted lines.
Figure 3:
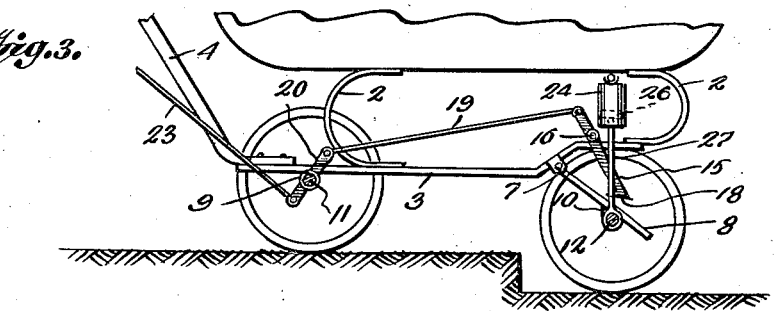
Fig. 3 is a side view showing the front wheels in a lowered position and the carriage being moved from a sidewalk onto a street.
Figure 4:
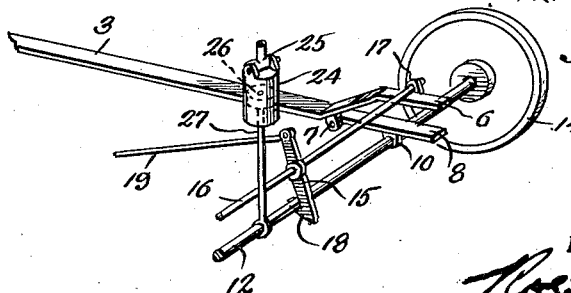
Fig. 4 is a perspective view showing a portion of the front axle and the latch-mechanism for normally holding the axle raised.

The improved baby carriage has a body 1 which may be formed of any suitable material and is supported over a frame by springs 2 which have their lower ends mounted upon side bars 3 of the frame. Handles 4 extend rearwardly from the side bars at an upward incline and at their rear ends carry a handle bar 5. Forward end portions 6 of the side bars are bent upwardly to an offset position and at rear ends of these offset portions are depending ears 7 to which are pivoted rear ends of auxiliary bars 8 which project forwardly from the ears under the offset portions 7 and may be swung from the normal position shown in Figure 1 to the downwardly extending inclined position shown in Figure 3. Depending ears or brackets 9 and 10 are carried by the side bars and the auxiliary bars and carry the axles 11 and 12 upon which wheels 13 and 14 are mounted. Since the auxiliary bars 8 are pivotally mounted for vertical movement the front wheels may move from the normal position shown in Figure 1 when the carriage is being rolled along a sidewalk or other even surface to the lowered position shown in Figure 3 and the carriage maintained level while moving from a sidewalk onto a street.

In order to releasably hold the front wheels in the normal position there has been provided a latch 15 pivoted upon a rod 16 which extends transversely of the frame over the front axle 12 and is mounted through ears 17 projecting upwardly from the upwardly offset forward portions 6 of the side bars 3. A bill 18 is provided at the lower end of the latch for engaging under the front axle and the upper end of the latch is pivoted to the front end of a rod 19 which extends longitudinally of the frame and has its rear end pivoted to the upper end of a lever 20 pivoted upon the rear axle 11. An actuating lever 21 is pivoted to a bracket 22 carried by the handle bar 5 and this lever 21 is connected with the lower end of lever 20 by a rod 23. When forward pressure is applied to the actuating lever the lever 20 will be tilted about the rear axle and pull exerted upon the rod 19 to tilt the latch about the rod 17 and move its bill from under the front axle. The front axle may then move downwardly and the front wheels will drop downwardly for contact with a street as the baby carriage is moved over a curb between the sidewalk and a street.

Upward movement of the auxiliary bars 8 to the normal position should be yieldingly checked so that the rear wheels may be in position to rest upon the street after passing over the curb. This is accomplished by a dash pot consisting of a cylinder 24 having its upper end connected with the bottom of the body 1 by a pivotal connection 25 and a piston 26 which is slidable longitudinally in the cylinder and has its piston rod 27 projecting from the lower end of the cylinder. The lower end of the piston rod is engaged about the front axle 12 and when the front wheels rest upon the street tendency of the piston to move upwardly in the cylinder will be checked by air in the cylinder above the piston and upward movement of the piston will be slowed to such an extent that by the time it reaches its normal position in the cylinder the rear wheels will have moved off of the sidewalk and come to rest upon the street. The actuating lever 21 may then be pulled rearwardly and the latch returned to its normal position in which its bill will again engage under the front axle and secure the front axle in its normal position. It will thus be seen that the baby carriage may be very easily moved from a sidewalk over a curb and down upon a street without being tilted forwardly and there will be no danger of a baby falling out of the carriage and also the person pushing the baby carriage will be relieved of strain caused when a carriage having a rigidly mounted front axle is pushed from a sidewalk onto a street.

Having thus described the invention, what is claimed is:

1. In a baby carriage, a frame having side bars, auxiliary bars pivoted to the side bars for vertical swinging movement, a rear axle carried by said side bars, a front axle carried by said auxiliary bars, wheels carried by the front and rear axles, a rod over the front axle carried by the side bars, a latch pivotally suspended from said rod for engaging under the front axle and supporting the front axle in its normal position, a lever pivoted to the rear axle, a rod connecting the upper end of said lever with said latch, an actuating lever pivoted to said handle, a rod connecting the actuating lever with the lower end of the first lever, a cylinder mounted over the front axle, and a piston in said cylinder and having a piston rod extending from the lower end of the cylinder and having its lower end connected with the front axle, said piston constituting means for retarding upward movement of the auxiliary arms and the front axle to the normal position.

2. In a baby carriage, a frame having side bars, auxiliary bars pivoted to the side bars for vertical swinging movement, a rear axle carried by said side bars, a front axle carried by said auxiliary bars, wheels carried by the front and rear axles, a rod over the front axle carried by the side bars, a latch pivotally suspended from said rod for engaging under the front axle and supporting the front axle in its normal position, means for moving said latch to a position for releasing the front axle and allowing downward movement of the front wheels, and a dash pot for yieldably resisting return of the front axle and wheels thereon to the normal position.

CHARLES RIZZUTO.

REFERENCES CITED

The following references are of record in the file of this patent:

UNITED STATES PATENTS

| Number | Name | Date |
|---|---|---|
| 1,890,469 | Powers | Dec. 13, 1932 |
| 1,307,275 | Spaulding | June 17, 1919 |
| 572,658 | Marx | Dec. 8, 1896 |
| 1,119,002 | Uherkocz | Dec. 1, 1914 |
| 1,413,422 | Nassoit | Apr. 18, 1922 |
| 1,785,646 | Pascoo | Dec. 16, 1930 |
| 2,087,069 | Pascolesco | July 13, 1937 |
| 2,390,671 | Tannenbaum | Dec. 11, 1945 |